(12) United States Patent
Furusawa

(10) Patent No.: US 8,739,845 B2
(45) Date of Patent: Jun. 3, 2014

(54) PNEUMATIC TIRE

(75) Inventor: Hiroshi Furusawa, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 573 days.

(21) Appl. No.: 13/046,613

(22) Filed: Mar. 11, 2011

(65) Prior Publication Data

US 2011/0220256 A1  Sep. 15, 2011

(30) Foreign Application Priority Data

Mar. 12, 2010  (JP) ................................. 2010-055401

(51) Int. Cl.
*B60C 11/11* (2006.01)

(52) U.S. Cl.
USPC .................. 152/209.15; 152/209.18

(58) Field of Classification Search
CPC ............ B60C 11/1376; B60C 2011/14; B60C 11/0306; B60C 11/11; B60C 11/12; B60C 11/1236; B60C 11/1259; B60C 2011/1245; B60C 2011/1259
USPC ............... 152/209.1, 209.4, 209.15, 210, 211
See application file for complete search history.

(56) References Cited

U.S. PATENT DOCUMENTS

| | | | | |
|---|---|---|---|---|
| D79,685 S | * | 10/1929 | Hower | D12/578 |
| D100,572 S | * | 7/1936 | Martin | D12/576 |
| 2,670,777 A | * | 3/1954 | Wallace | 152/209.4 |
| 3,001,568 A | * | 9/1961 | Suominen | 152/209.15 |
| 4,340,103 A | * | 7/1982 | Nilsson | 152/209.4 |
| 5,203,933 A | * | 4/1993 | Nagahisa | 152/209.15 |
| 6,575,215 B1 | * | 6/2003 | Hino et al. | 152/209.4 |
| 7,506,676 B2 | | 3/2009 | Ebiko | |
| 2012/0080129 A1 | * | 4/2012 | Furusawa | 152/209.15 |

FOREIGN PATENT DOCUMENTS

| | | | |
|---|---|---|---|
| JP | 07001919 | | 1/1995 |
| JP | 09193616 | | 7/1997 |
| JP | 2000247112 | | 9/2000 |
| JP | 2001-047817 | | 2/2001 |
| JP | 2002-248911 | * | 9/2002 |
| JP | 2002248909 | | 9/2002 |
| JP | 2003237318 | | 8/2003 |
| JP | 2006-151229 | | 6/2006 |
| JP | 2006-151231 | * | 6/2006 |
| WO | WO 2005/005170 | | 1/2005 |

OTHER PUBLICATIONS

Chinese Office Action dated Mar. 5, 2013, 8 pages, China.
Russian Official Decision of Grant dated May 21, 2012; application No. 2011109239/11; Inventor: Hiroshi Furusawa; Assignee: The Yokohama Rubber Co., Ltd.
Related German Application DE 10 2011 005319.0, The Yokohama Rubber Co., Ltd., Office Action Issued Mar. 9, 2012.

* cited by examiner

*Primary Examiner* — Eric Hug

(74) *Attorney, Agent, or Firm* — Thorpe North & Western LLP

(57) ABSTRACT

A pneumatic tire including, on a tread surface, rib-like land portions partitioned by a plurality of main grooves and/or a plurality of block-like land portions partitioned by lug grooves extending in a tire width direction, wherein sipes or small holes are provided in the land portions, multiple protrusions are disposed having a height that is less than a depth of the sipes or small holes, and the multiple protrusions are disposed so as to form a shape wherein a flow path width increases at a flow path convergence point where flow paths formed in a mesh-like shape between the protrusions converge from at least three directions, and a ratio of an area of the multiple protrusions to an area of a block-like land portion is 0.5 or greater and 0.9 or less.

20 Claims, 3 Drawing Sheets

PNEUMATIC TIRE

PRIORITY CLAIM

Priority is claimed to Japan Patent Application Serial No. 2010-055401 filed on Mar. 12, 2010.

BACKGROUND

1. Technical Field

The present technology relates to a pneumatic tire that is a studless tire having enhanced traveling performance on ice at initial use.

2. Related Art

Pneumatic tires known as "studless tires" have been proposed and put into actual use that have enhanced performance factors such as braking ability on ice and steering stability on snow when traveling on icy and snowy road surfaces.

Some studless tires use tread compounds containing fine protrusions as a filler so as to obtain an edge effect on icy surfaces, and some use rubber including fine voids so as to obtain a water pickup effect and an edge effect.

However, generally, if a rubber layer including the filler and/or microscopic voids is exposed on a tire surface, which directly contacts a mold when vulcanizing/curing the rubber, said rubber layer will not be formed. Therefore, the fillers and voids do not exist in the tread surface at initial use of the tire and the effectiveness of the filler and/or the voids are not displayed, or, even if displayed, a degree of said effectiveness is small.

Therefore, as a studless pneumatic tire capable of displaying high effectiveness at initial use, a pneumatic tire has been proposed including, in a tread surface, a plurality of land portions partitioned by a plurality of main grooves, wherein at least one sipe extending in the tire width direction divides the land portions, thus forming sub-blocks. Furthermore the land portions include a plurality of shallow grooves that are more shallow than the sipes, the shallow grooves extending from a center of the land portions in a water flow direction in the main grooves toward both edges, and where the shallow grooves are open to the main grooves. Open portions of the shallow grooves are positioned more on a downstream side of the flow direction in the main grooves than center portions of the land portions (Japanese Unexamined Patent Application Publication No. 2006-151229).

The subject matter of this proposal seeks to enhance the water pickup effect and edge effect by removing or draining water through a plurality of narrow grooves formed so as to extend in a single direction while inclining in the tire circumferential direction, or, via a plurality of narrow grooves formed so as to extend in two intersecting directions. However, in many cases, the subject matter of this proposal does not sufficiently display water removal or draining as a result of providing the narrow grooves, and thus, cannot be considered to be satisfactory.

SUMMARY

In light of the foregoing problems, the present technology provides a studless pneumatic tire that displays a high water pickup effect and edge effect when traveling on icy and snowy road surfaces at initial use, and after initial use also displays high braking ability on ice and steering stability on snow when traveling on icy and snowy road surfaces.

A pneumatic tire can include, on a tread surface, rib-like land portions partitioned by a plurality of main grooves and/or a plurality of block-like land portions partitioned by lug grooves extending in a tire width direction. Sipes or small holes are provided in the land portions. Multiple protrusions are disposed in the land portions having a height that is less than a depth of the sipes or small holes. The multiple protrusions are disposed so as to form flow paths in a shape such that a flow path width increases at a flow path convergence point. Flow paths formed in a mesh-like shape between the protrusions converge from at least three directions at the flow path convergence point. A ratio of an area of the multiple protrusions to an area of a block-like land portion is 0.5 or greater and 0.9 or less.

The pneumatic tire according to the present technology preferably has one or more of the following configurations:

The height of the protrusions is from 0.1 to 0.5 mm.

A minimum distance between adjacent protrusions is from 0.2 to 1.0 mm.

A road contact surface area of each of the protrusions is from 0.03 to 20 $mm^2$.

A shape of the road contact surface of the protrusions is roughly circular.

With the present technology, sipes or small holes are provided in block-like land portions of a tread, and multiple protrusions are disposed having a height that is less than a depth of the sipes or small holes. Moreover, the multiple protrusions are disposed so as to form a shape wherein a flow path width increases at a flow path convergence point where flow paths formed in a mesh-like shape between the protrusions converge from at least three directions. Thereby, high water pickup effect and edge effect can be obtained when traveling on icy and snowy road surfaces, even at initial use of a studless pneumatic tire. Additionally, a studless pneumatic tire is provided in which, after initial use and even after the effectiveness of the multiple protrusions has declined, the sipes or small holes enable superior edge effect to be displayed and enable braking ability on ice and steering stability on snow.

With a pneumatic tire implementing at least one of the configurations described, a pneumatic tire is provided that more prominently displays the effects obtained via a pneumatic tire without such a configuration.

DETAILED DESCRIPTION

A detailed explanation of the pneumatic tire of the present technology will be given below while referencing the drawings.

Figure 1:
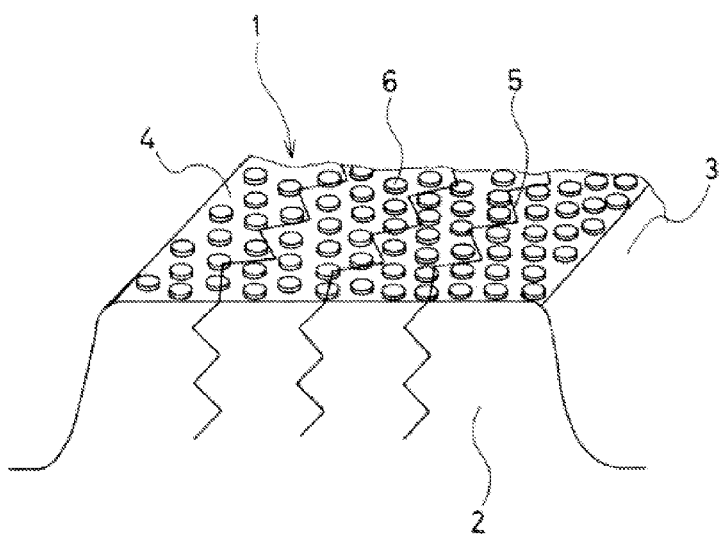
FIG. 1 is a perspective view illustrating a land portion of a tread surface of a pneumatic tire of the present technology.
Figure 2A:
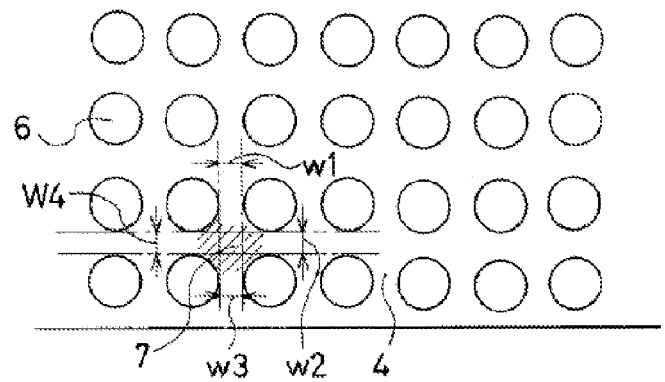
FIGS. 2A to 2C are plan views, each illustrating an arrangement example of the multiple protrusions in the block-like land portions of the tread surface of the pneumatic tire of the present technology.
Figure 3:
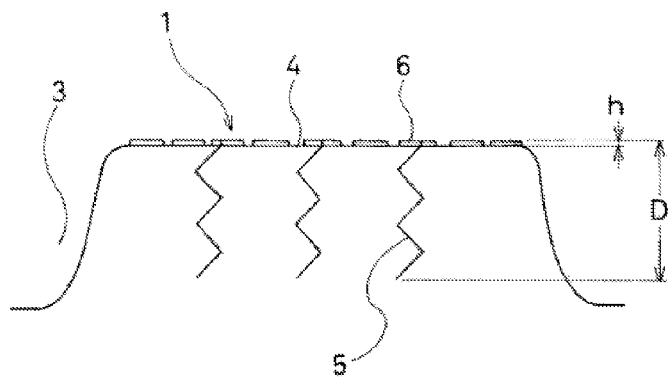
FIG. 3 is a cross-sectional view illustrating a land portion of the tread surface of the pneumatic tire of the present technology.

As illustrated in FIG. 1 and FIG. 3, a pneumatic tire of the present technology includes, on a tread surface 1, rib-like land portions 4 partitioned by a plurality of main grooves 2 and/or a plurality of block-like land portions 4 partitioned by lug grooves 3 extending in a tire width direction, wherein sipes or small holes 5 are provided in the land portions 4, and multiple protrusions 6 are disposed having a height h that is less than a depth D of the sipes or small holes 5. Moreover, the multiple protrusions 6 are arranged so as to form a shape wherein a flow path width ($w_1$, $w_2$, $w_3$, and $w_4$ in FIG. 2A) increases at a flow path convergence point 7 where the flow paths formed in a mesh-like shape between the protrusions 6 converge from at least three directions.

Furthermore, a ratio of an area of the multiple protrusions to an area of a block-like land portion is 0.5 or greater and 0.9 or less.

With the present technology, the flow paths are not easily blocked by snow because the flow path width ($w_1$, $w_2$, $w_3$, and $w_4$ in FIG. 2A) increases at the flow path convergence point 7 where the flow paths converge from at least three directions. Moreover, the flow path is not easily blocked by snow, and water discharge performance is ensured, even in cases where the block-like land portions of the tire are subjected to ground contact contraction while traveling, because the flow path width is formed so as to be large at the flow path convergence point 7. Therefore, water removal or draining effects can be sufficiently displayed and effectiveness of fillers in the tread compound and void layers of the tire at a stage of initial use, where said effectiveness is not easily displayed, can be compensated for by the performance factors thereof. Thereby, excellent braking ability on ice and steering stability on snow are obtained.

It is important that the multiple protrusions 6 contribute to forming the mesh-like flow paths as described above. Additionally, it is important that the shape of the flow paths enables the flow path width ($w_1$, $w_2$, $w_3$, and $w_4$ in FIG. 2A) to increase at the flow path convergence point 7, where the flow paths converge from at least three directions. Specifically, it is important that, when viewed planarly, the multiple protrusions 6 form a circular shape, an elliptical shape, a polygonal (triangular, rectangular, pentagonal, hexagonal, etc.) shape having roundly chamfered corners (apexes), or a hexagonal shape, an octagonal shape, or the like that does not have roundly chamfered corners. It is difficult to obtain effectiveness with the present technology if only stripe-like (banded) intersecting grooves or intersecting inclining grooves are provided because the flow path width at the flow path convergence point cannot be widened.

After the role at initial use of the multiple protrusions 6 is finished and wearing takes place, the sipes or small holes extensively assume the main role of ensuring braking ability on ice and steering stability on snow. Sipes or small holes that are used in conventional studless tires can be used. The depth D of the sipes or small holes 5 must be greater than the height h of the multiple protrusions 6 because the sipes or small holes assume the main role after the role at initial use of the multiple protrusions 6 is finished and wearing takes place. Regarding shapes of the sipes or small holes, the sipes preferably have, for example a wave-like shape or a shape that changes in a depth direction (a so-called "3D sipe"); and the small holes are, for example, preferably roughly circular or polygonal.

Additionally, the ratio of the area of the multiple protrusions 6 to the area of a block-like land portion must be 0.5 or greater and 0.9 or less in order for the effectiveness of the provided multiple protrusions 6 to be displayed excellently. If the ratio is less than 0.5 or greater than 0.9, the flow paths cannot be effectively formed in the land portions. Preferably, the ratio of the area of the multiple protrusions 6 to the area of the block-like land portions is 0.6 or greater and 0.8 or less because such a ratio leads to the flow paths being formed more effectively.

Additionally, the height of the multiple protrusions 6 is preferably from 0.1 to 0.5 mm. If the height is less than 0.1 mm, a water path depth will not be sufficient and excellent water draining effects cannot be expected. If the height exceeds 0.5 mm, block rigidity will decline, leading to a decline in traveling performance, and the risk of uneven wear occurring due to deformation caused by contact will increase. From a perspective of obtaining greater effectiveness, the height of the multiple protrusions 6 is more preferably from 0.20 to 0.35 mm.

Additionally, a minimum distance between adjacent protrusions 6 is preferably from 0.2 to 1.0 mm. It is not preferable that the minimum distance between adjacent protrusions 6 be less than 0.2 mm because the flow path width will be too narrow and excellent water draining effects cannot be expected. Moreover, it is not preferable that the minimum distance between adjacent protrusions 6 exceed 1 mm because block rigidity will decline, leading to a decline in traveling performance. In short, in order to balance functionality of the flow path with traveling performance, a narrowest width of the flow path portion is preferably from 0.2 to 1.0 mm.

Additionally, a road contact surface area of each of the protrusions 6 is preferably from 0.03 to 20 $mm^2$. If the road contact surface area is less than 0.03 $mm^2$, the effectiveness of the present technology will decline because it will be difficult to obtain a contact patch and ensure the rigidity of the actual contact patch. Also, if the road contact surface area of each of the protrusions 6 exceeds 20 $mm^2$ the effectiveness of the present technology will decline because sufficient flow paths when disposing the multiple protrusions 6 in the blocks cannot be obtained and water draining performance will decline. From a perspective of obtaining greater effectiveness, the road contact surface area of each of the protrusions 6 is preferably from 0.07 to 10 $mm^2$.

Figure 2B:
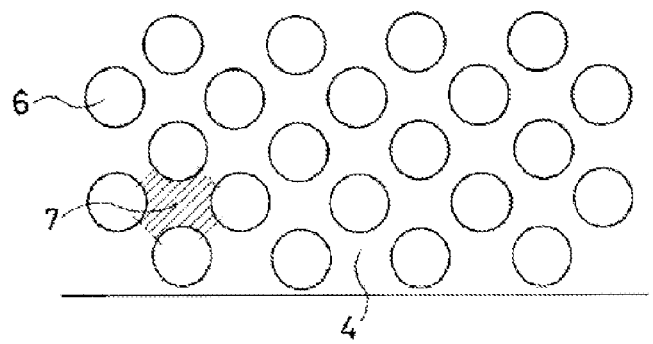

A shape of the road contact surface of the multiple protrusions 6 is preferably roughly circular. FIGS. 2A and 2B illustrate an example where a roughly circular shape is used. Using a roughly circular shape as the shape of the road contact surface of the multiple protrusions 6 in this way is preferable because a desired flow path width at the flow path convergence point 7, where the flow paths converge from at least three directions, can be simply and assuredly obtained. Also as a result of the roughly circular shape, a rigidity difference of the protrusions with respect to an angle of an outer force on the shape of the protrusions 6 lessens, and it becomes possible to suppress changes in traveling performance due to the multiple protrusions 6 being regularly disposed in a lattice-like form (FIG. 2A) or an inclined lattice-like form (FIG. 2B) on a tread pattern.

Figure 2C:
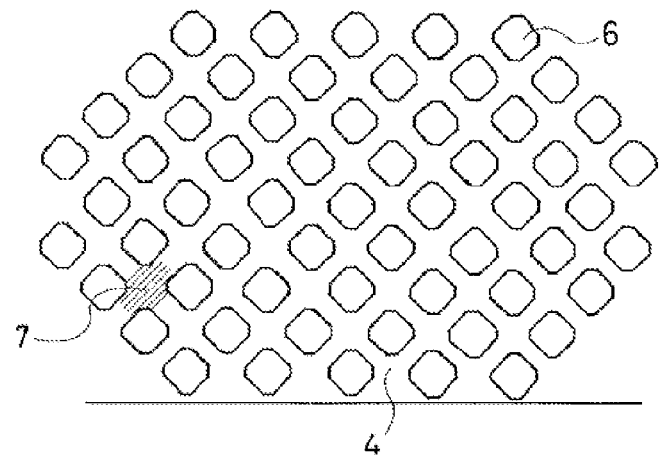

FIG. 2C illustrates an example wherein the shape of the road contact surface is a square shape having rounded corners, arranged in an inclined lattice-like form. This mode is preferable because the edge effect can be enhanced in comparison with a mode using a roughly circular shape. Additionally, with protrusions having an equiangular hexagonal road contact surface shape, by arranging while tilting at an angle, a large flow path width at the flow path convergence point 7, where the flow paths converge from at least three directions, can be formed without rounding the corners.

EXAMPLES

Six types of pneumatic tires (Conventional Example, Comparative Examples 1 to 3, and Working Examples 1 and 2) were fabricated test tires having a common tire size of 215/60R16. The presence/absence of, shape/height of, and area ratios of the protrusions varied for each tire. Sipes were provided having a depth of 6 mm, an amplitude of 0.8 mm, and a pitch of 2.4 mm.

Each of the six types of tires were rim assembled on a 16×7J size rim (major rim), inflated to an air pressure of 220 kPa, and mounted on a 2000 cc sedan (FR vehicle). Then, the following traveling tests were conducted on a test course. The test results are as shown in Table 1. The pneumatic tires of the present technology had braking performance on ice and steering stability on snow and displayed extremely superior performance factors beyond those of the pneumatic tires of the Conventional Example and the Comparative Examples.

(1) Braking Ability on Ice Test:

Braking distances required to come to a complete stop from an initial speed of 80 km/hr on an icy road test course was measured. Braking distance index values were recorded with the Conventional Example being 100. Larger index values indicate superior braking on ice.

(2) Steering Stability on Snow Test:

Sensory evaluations by a test driver were conducted on a snowy road test course. Index values were recorded with the tire of the Conventional Example being evaluated as 100. Larger index values indicate superior steering stability on snow.

TABLE 1

| | Conv. Ex. | W.E. 1 | Comp. Ex. 1 | Comp. Ex. 2 | W.E. 2 | Comp. Ex. 3 |
|---|---|---|---|---|---|---|
| Shape of the Protrusions | — | Hexagonal (roundly chamfered corners) | Band-like protrusions formed only at straight shallow grooves in the circumferential direction | Rhomboid-like protrusions formed by straight shallow grooves (an inclining grid of striped grooves) intersecting at an angle of ±30° with respect to the circumferential direction | Circular | Circular |
| Protrusion height (mm) | N/A | 0.3 | 0.3 | 0.3 | 0.3 | 1.5 |
| Adjacent smallest flow path width (mm) | N/A | 0.6 | 0.6 | 0.6 | 0.6 | 2 |
| Area of the multiple protrusions/area of the block-like portion | — | 0.8 | 0.9 | 0.8 | 0.8 | 0.4 |
| Braking ability on ice | 100 | 120 | 105 | 110 | 120 | 70 |
| Steering stability on snow | 100 | 103 | 95 | 100 | 105 | 80 |

In Table 1, "Cony. Ex." is an abbreviation for "Conventional Example"; "W.E." is an abbreviation for "Working Example"; and "Comp. Ex." is an abbreviation for "Comparative Example."

What is claimed is:

1. A pneumatic tire comprising, on a tread surface,
   rib-like land portions partitioned by a plurality of main grooves, and/or a plurality of block-like land portions partitioned by lug grooves extending in a tire width direction, wherein
   sipes or small holes are provided in the land portions,
   multiple protrusions are disposed on the land portions having a height that is less than a depth of the sipes or small holes,
   the multiple protrusions are disposed on the land portions so as to form a plurality of flow paths there between, wherein a width of an individual flow path increases at a flow path convergence point where flow paths between the protrusions converge from at least three directions, and
   a ratio of an area of the multiple protrusions to an area of a block land portion is 0.5 or greater and 0.9 or less.

2. The pneumatic tire according to claim 1, wherein the height of the protrusions is from 0.1 to 0.5 mm.

3. The pneumatic tire according to claim 1, wherein a minimum distance between adjacent protrusions is from 0.2 to 1.0 mm.

4. The pneumatic tire according to claim 1, wherein a road contact surface area of the protrusions is from 0.03 to 20 mm$^2$.

5. The pneumatic tire according to claim 1, wherein a shape of the road contact surface of the protrusions is roughly circular.

6. The pneumatic tire according to claim 1, wherein the flow paths converge from at least four directions.

7. The pneumatic tire according to claim 1, wherein a shape of the road contact surface of the protrusions is a polygonal shape having roundly chamfered corners.

8. The pneumatic tire according to claim 1, wherein a shape of the road contact surface of the protrusions is a polygonal shape having at least six sides.

9. The pneumatic tire according to claim 1, wherein a shape of the road contact surface of the protrusions is an elliptical shape.

10. The pneumatic tire according to claim 1, wherein the sipes or small holes comprise sipes having a wave-like shape or a shape that changes in a depth direction of the pneumatic tire.

11. The pneumatic tire according to claim 1, wherein the sipes or small holes comprise small holes that are roughly circular or polygonal in shape.

12. The pneumatic tire according to claim 1, wherein the ratio of the area of the multiple protrusions to the area of the block-like land portions is 0.6 or greater and 0.8 or less.

13. The pneumatic tire according to claim 1, wherein a height of the multiple protrusions is from 0.20 to 0.35 mm.

14. The pneumatic tire according to claim 1, wherein a road contact surface area of each of the protrusions is from 0.07 to 10 mm$^2$.

15. The pneumatic tire according to claim 1, wherein the multiple protrusions are regularly disposed in a lattice-like form.

16. The pneumatic tire according to claim 1, wherein the multiple protrusions are regularly disposed in an inclined lattice-like form.

17. The pneumatic tire according to claim 1, wherein the multiple protrusions have a square road contact surface shape having rounded corners and are arranged in an inclined lattice-like form.

18. The pneumatic tire according to claim 1, wherein the multiple protrusions have an equiangular hexagonal road contact surface shape and are arranged in an inclined lattice-like form.

19. The pneumatic tire according to claim 2, wherein a minimum distance between adjacent protrusions is from 0.2 to 1.0 mm.

20. The pneumatic tire according to claim 2, wherein a road contact surface area of each of the protrusions is from 0.03 to 20 mm$^2$.

* * * * *